United States Patent
Hoots et al.

(10) Patent No.: US 9,169,884 B2
(45) Date of Patent: Oct. 27, 2015

(54) WET BRAKE ASSEMBLY

(75) Inventors: David C. Hoots, Forsyth, IL (US); Barry D. Bliss, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 645 days.

(21) Appl. No.: 13/355,936

(22) Filed: Jan. 23, 2012

(65) Prior Publication Data

US 2013/0186714 A1    Jul. 25, 2013

(51) Int. Cl.
| | |
|---|---|
| *F16D 55/36* | (2006.01) |
| *F16D 65/853* | (2006.01) |
| *F16D 65/12* | (2006.01) |
| *F16D 121/04* | (2012.01) |
| *F16D 123/00* | (2012.01) |
| *F16D 121/06* | (2012.01) |

(52) U.S. Cl.
CPC .............. *F16D 55/36* (2013.01); *F16D 65/12* (2013.01); *F16D 65/853* (2013.01); *F16D 2121/04* (2013.01); *F16D 2121/06* (2013.01); *F16D 2123/00* (2013.01)

(58) Field of Classification Search
CPC ....... F16D 55/40; F16D 65/853; F16D 65/12; F16D 2121/04; F16D 2121/06; F16D 2123/00
USPC ......... 188/71.5, 71.6, 264 D, 264 E, 264 CC, 188/170
See application file for complete search history.

(56) References Cited

U.S. PATENT DOCUMENTS

| | | | |
|---|---|---|---|
| 4,010,830 A | 3/1977 | Logus et al. | |
| 4,358,000 A | 11/1982 | Cumming | |
| 4,396,100 A | 8/1983 | Eltze | |
| 4,655,326 A | 4/1987 | Osenbaugh | |
| 5,050,710 A | * 9/1991 | Bargfrede | 188/71.6 |
| 5,174,420 A | * 12/1992 | DeWald et al. | 188/264 E |

(Continued)

FOREIGN PATENT DOCUMENTS

| | | | |
|---|---|---|---|
| JP | 2001-193774 A | 7/2001 | |
| JP | 2001193774 A | * 7/2001 | ............ F16D 65/853 |

(Continued)

OTHER PUBLICATIONS

U.S. Appl. No. 12/950,807 by Norval P. Thomson filed Nov. 19, 2010 entitled "Motor Grader Wheel Slip Control for Cut to Grade".

(Continued)

*Primary Examiner* — Robert A Siconolfi
*Assistant Examiner* — Charles Poon
(74) *Attorney, Agent, or Firm* — Finnegan, Henderson, Farabow, Garrett & Dunner, LLP

(57) ABSTRACT

A brake assembly for a mobile machine is disclosed. The brake assembly may have a stationary housing forming a coolant inlet and a coolant outlet, a rotatable member, and a disc stack disposed within a cavity at least partially formed by the stationary housing and the rotatable member. The disc stack may have a plurality of friction plates operatively coupled to the rotatable member and a plurality of separator plates interleaved with the plurality of friction plates and operatively coupled to the stationary housing. The brake assembly may also have a piston disposed within the cavity and configured to compress the disc stack, and a seal located at an axial interface between the stationary housing and the rotatable member and downstream of the disc stack relative a flow of coolant from the coolant inlet to the coolant outlet.

20 Claims, 5 Drawing Sheets

(56) References Cited

U.S. PATENT DOCUMENTS

| | | | |
|---|---|---|---|
| 5,495,927 A * | 3/1996 | Samie et al. | 192/70.12 |
| 5,505,267 A | 4/1996 | Orbach et al. | |
| 5,535,850 A * | 7/1996 | Tar et al. | 184/6.12 |
| 5,540,305 A | 7/1996 | Hammond et al. | |
| 5,802,489 A | 9/1998 | Orbach et al. | |
| 6,038,506 A | 3/2000 | Diekhaus et al. | |
| 6,062,367 A | 5/2000 | Hirayanagi et al. | |
| 6,174,255 B1 | 1/2001 | Porter et al. | |
| 6,186,285 B1 | 2/2001 | Parsons | |
| 6,237,727 B1 | 5/2001 | Tatewaki et al. | |
| 6,264,009 B1 * | 7/2001 | Johnson | 188/72.6 |
| 6,357,558 B1 * | 3/2002 | Case et al. | 188/71.5 |
| 6,524,207 B2 | 2/2003 | Murakami et al. | |
| 6,766,886 B2 | 7/2004 | Bendtsen et al. | |
| 6,820,712 B2 | 11/2004 | Nakamura | |
| 7,014,027 B2 | 3/2006 | Adair et al. | |
| 7,258,208 B1 | 8/2007 | Dennis et al. | |
| 7,291,094 B2 | 11/2007 | Heier et al. | |
| 7,506,730 B2 | 3/2009 | Strandberg et al. | |
| 7,650,961 B2 | 1/2010 | Smith et al. | |
| 7,693,639 B2 | 4/2010 | Suzuki et al. | |
| 7,770,681 B2 | 8/2010 | Marathe et al. | |
| 7,980,364 B2 | 7/2011 | Ueno | |
| 7,980,375 B2 | 7/2011 | Suzuki et al. | |
| 8,006,813 B2 | 8/2011 | James et al. | |
| 2003/0150674 A1 * | 8/2003 | Daigre | 188/71.5 |
| 2005/0098401 A1 * | 5/2005 | Hamilton et al. | 188/378 |
| 2009/0101458 A1 * | 4/2009 | Strandberg et al. | 188/218 XL |
| 2010/0300776 A1 | 12/2010 | Cliff et al. | |
| 2011/0000750 A1 | 1/2011 | Schnell et al. | |

FOREIGN PATENT DOCUMENTS

| | | |
|---|---|---|
| JP | 2011021405 | 2/2011 |
| WO | 2011-102252 A1 | 8/2011 |

OTHER PUBLICATIONS

U.S. Appl. No. 12/972,866 to Dennis Wetterich et al. filed Dec. 20, 2010 entitled "Traction Slip Indicator".

U.S. Patent Application by Gerry O. McCann et al. entitled "Powertrain System Having Lockable Differential" filed on Jan. 23, 2012.

U.S. Patent Application by David C. Hoots et al. entitled "Brake Assembly Having Piloted Park Brake Housing" filed on Jan. 23, 2012.

U.S. Patent Application entitled "Multi-Brake System Having Independent Control" filed on Jan. 23, 2012.

U.S. Patent Application by Christopher A. Monroe entitled "Separator Plate for Brake Assembly" filed on Jan. 23, 2012.

* cited by examiner

WET BRAKE ASSEMBLY

TECHNICAL FIELD

The present disclosure is directed to a brake assembly and, more particularly, to a wet brake assembly for a mobile machine.

BACKGROUND

Machines, including wheel loaders, on and off-highway haul and vocational trucks, motor graders, and other types of heavy equipment generally include a mechanical transmission drivingly coupled to opposing traction devices by way of front and/or rear differentials and two substantially identical final drives (one located between each differential and an associated traction device). Each differential receives a power input from the transmission and produces two power outputs directed through the final drives to the traction devices. The final drives function to reduce a rotational speed of the differential output to a level appropriate to drive the associated traction devices and thereby propel the machine.

Each final drive generally includes a stationary housing, an axle rotatably disposed within the housing and driven by the differential, and a brake assembly connected between the housing and the axle. Typical brake assemblies include a plurality of friction plates connected to rotate with the axle, a plurality of separator plates disposed between adjacent friction plates and rotationally constrained at their periphery by the housing, and a piston configured to push the friction plates and separator plates together, thereby generating frictional torque between the plates that retards rotation of the axle. Brake assemblies that are cooled via fluid are known as wet brake assemblies. Brake assemblies that are cooled via circulating fluid are known as force-cooled wet brake assemblies.

An example of a wet brake assembly is described in U.S. Pat. No. 4,655,326 issued to Osenbaugh on Apr. 7, 1987 ("the '326 patent"). Specifically, the '326 patent discloses a multiple disc brake that is located at a planetary wheel end of a final drive. The brake includes a plurality of rotatable and non-rotatable discs disposed within a stack for selectively interconnecting ring and sun gears of a planetary drive unit. The brake also includes a piston for engaging and moving the disc stack into frictional contact with a carrier of the planetary drive unit to restrain rotation of the sun gear and an output member. The piston is contained within a chamber formed by a portion of the planetary drive unit ring gear and a portion of an adapter secured to the outer end of a non-rotatable spindle. An oil circulation system is incorporated into the outer end of the spindle to supply oil to an inner periphery of the disc stack, allowing the oil to flow radially outward through the disc stack, thereby cooling the brake.

The brake of the '326 patent may be less than optimal. In particular, because the cooling oil is supplied to the inner periphery of the disc stack, restrictions associated with flow through the disk stack could raise a pressure of the oil at locations upstream of the disc stack. In some situations, this elevated pressure could cause seals that are located upstream of the disc stack (e.g., between the spindle and the ring gear) to leak.

The brake assembly of the present disclosure is directed toward solving one or more of the problems set forth above and/or other problems of the prior art.

SUMMARY

One aspect of the present disclosure is directed to a brake assembly. The brake assembly may include a stationary housing forming a coolant inlet and a coolant outlet, a rotatable member, and a disc stack disposed within a cavity at least partially formed by the stationary housing and the rotatable member. The disc stack may have a plurality of friction plates operatively coupled to the rotatable member, and a plurality of separator plates interleaved with the plurality of friction plates and operatively coupled to the stationary housing. The brake assembly may also include a piston disposed within the cavity and configured to compress the disc stack, and a seal located at an axial interface between the stationary housing and the rotatable member and downstream of the disc stack relative a flow of coolant from the coolant inlet to the coolant outlet.

Another aspect of the present disclosure is directed to a method of cooling a brake. The method may include directing coolant axially into the brake assembly through a stationary housing to an outer periphery of a disc stack, and directing coolant from the outer periphery of the disc stack radially inward through the disc stack. The method may also include directing coolant from the disc stack past a seal disposed at an interface between the stationary housing and a rotatable member, and directing coolant from disc stack axially out of the brake assembly through the stationary housing.

DETAILED DESCRIPTION

Figure 1:
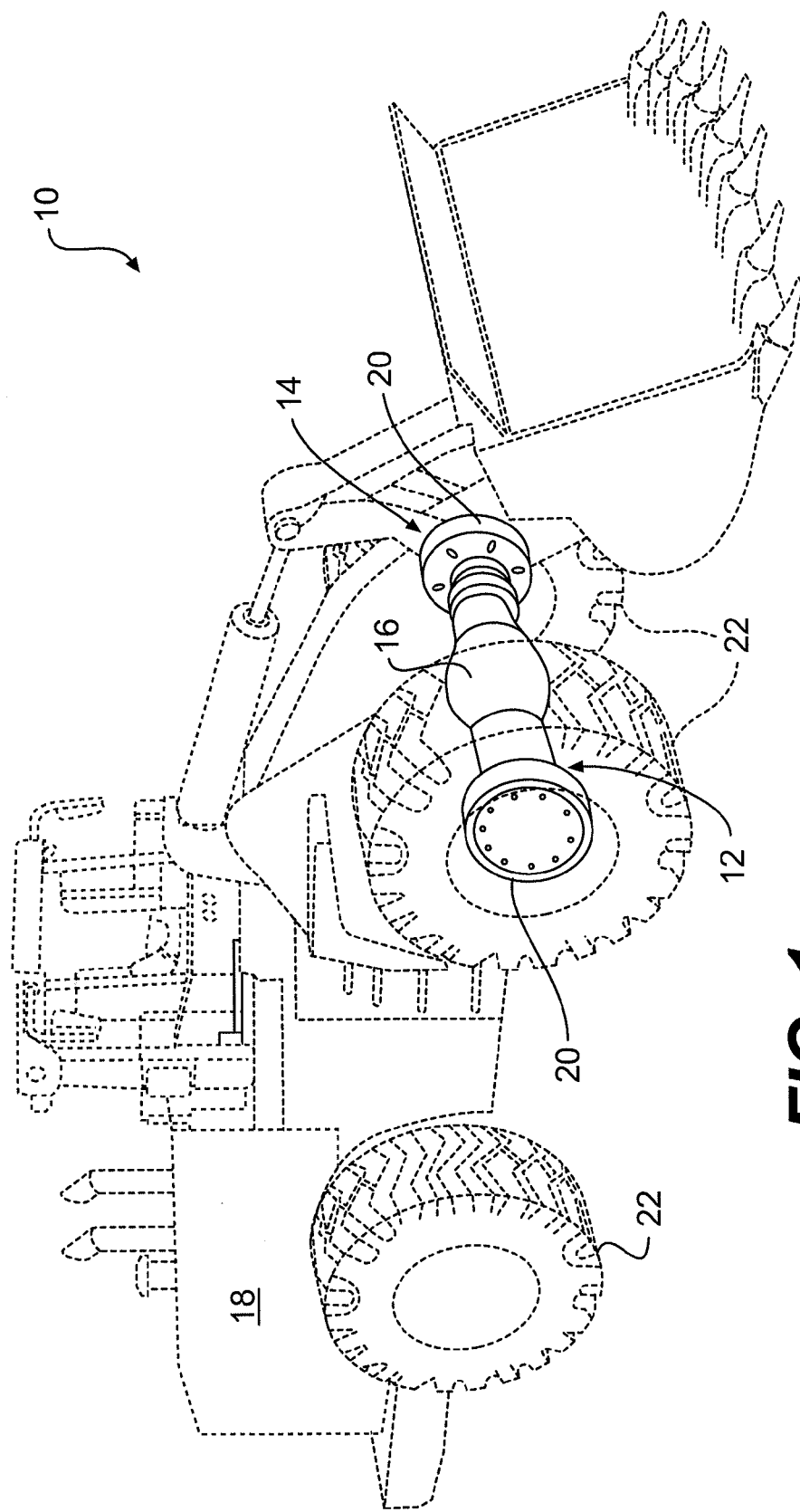
FIG. 1 is a pictorial illustration of an exemplary disclosed machine.

FIG. 1 illustrates an exemplary mobile machine 10 having right and left final drives 12, 14 coupled to each other by way of a differential 16. An input member, such as a driveshaft (not shown), may drivingly connect an engine 18 of machine 10 to differential 16, and an output member 20, such as a wheel, may drivingly connect final drives 12, 14 to traction devices 22 located on opposing sides of machine 10. In one embodiment, traction devices 22 may be tires, although other types of traction devices 22 may alternatively be utilized. Final drives 12, 14, may be drivingly coupled to differential 16 such that a rotation of the input member results in a corresponding rotation of traction devices 22.

Figure 2:
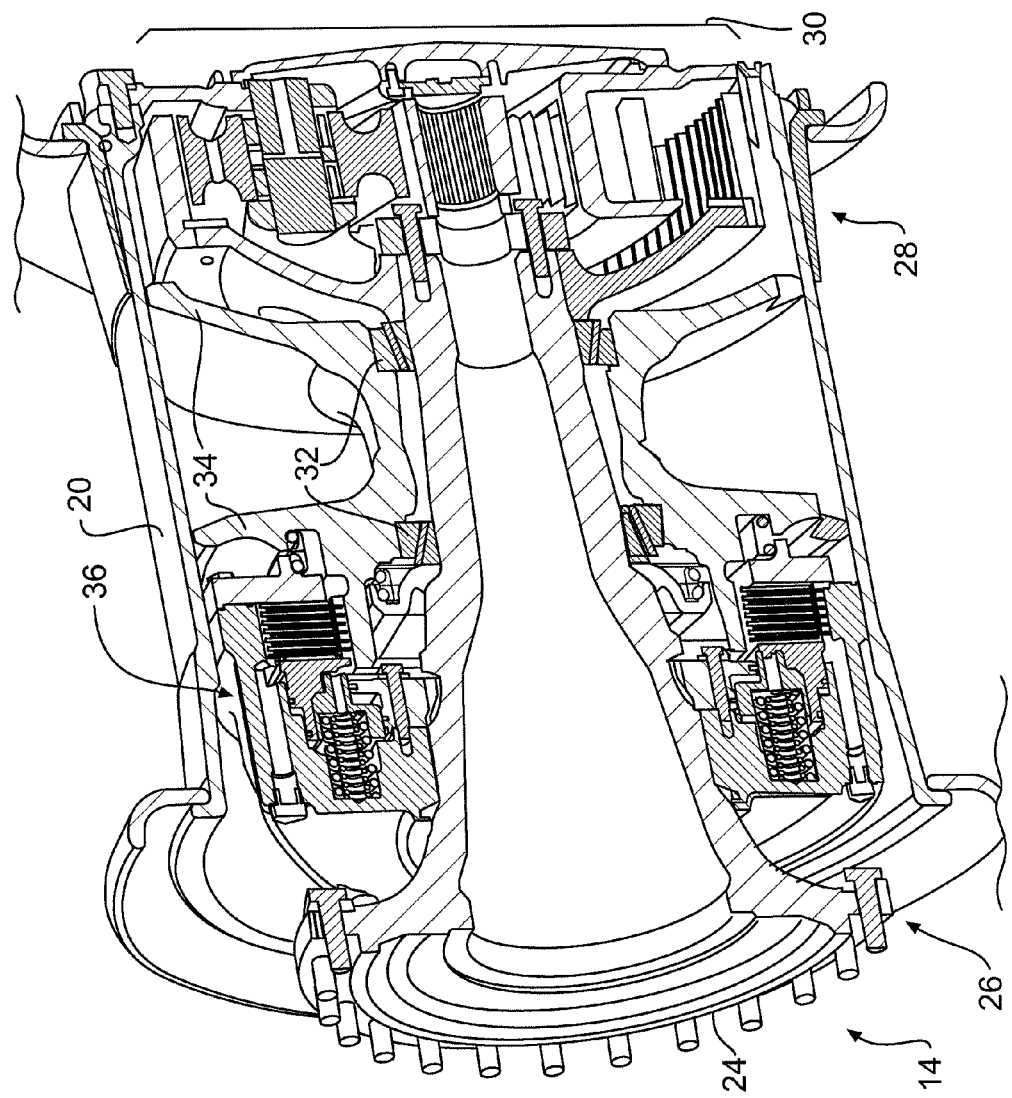
FIG. 2 is a cutaway illustration of an exemplary disclosed final drive that can be utilized in conjunction with the machine of FIG. 1.

Left final drive 14, as illustrated in FIG. 2, may include an internal housing 24 (e.g., a spindle) configured to engage a stationary body of machine 10 (e.g., a housing of differential 16) at a first end 26 and support at an opposing second end 28 a planetary gear arrangement 30. Planetary gear arrangement 30 may be driven by differential 16 via an axle (not shown) that passes through a center of internal housing 24. One or more bearings 32 may be spaced apart along an outside of internal housing 24 to support rotation of output member 20 via one or more radially-extending webs 34. In this arrangement, webs 34 and output member 20 may be integral or otherwise rigidly connected to rotate together about internal housing 24. Output member 20 may be driven by differential 16 and speed-reduced by planetary gear arrangement 30. Although not shown in detail in the figures, it should be noted that right final drive 12 may be substantially identical to left final drive 14.

Figure 3:
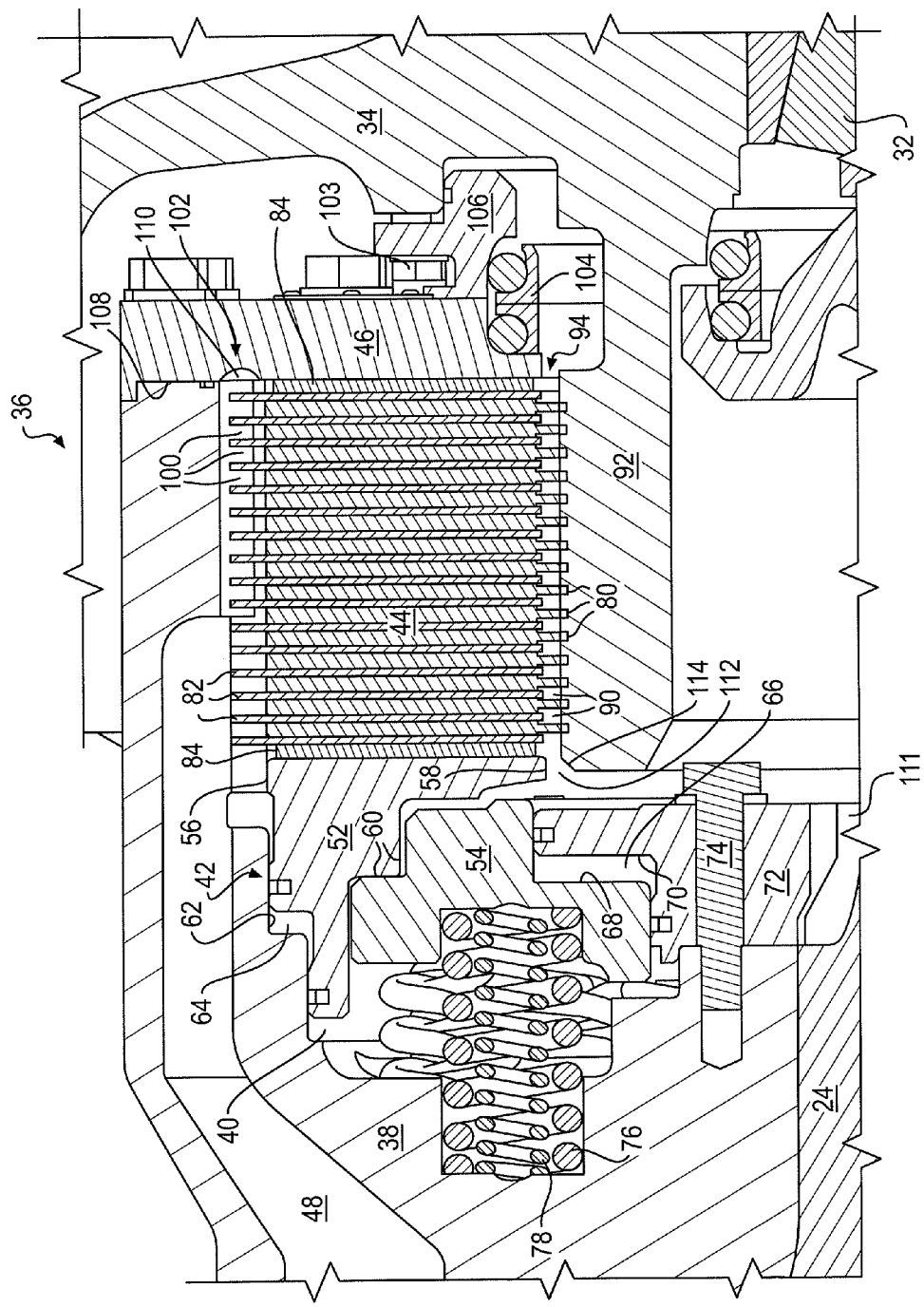
FIG. 3 is a cross-sectional illustration of a brake assembly associated with the final drive of FIG. 2.
Figure 4:
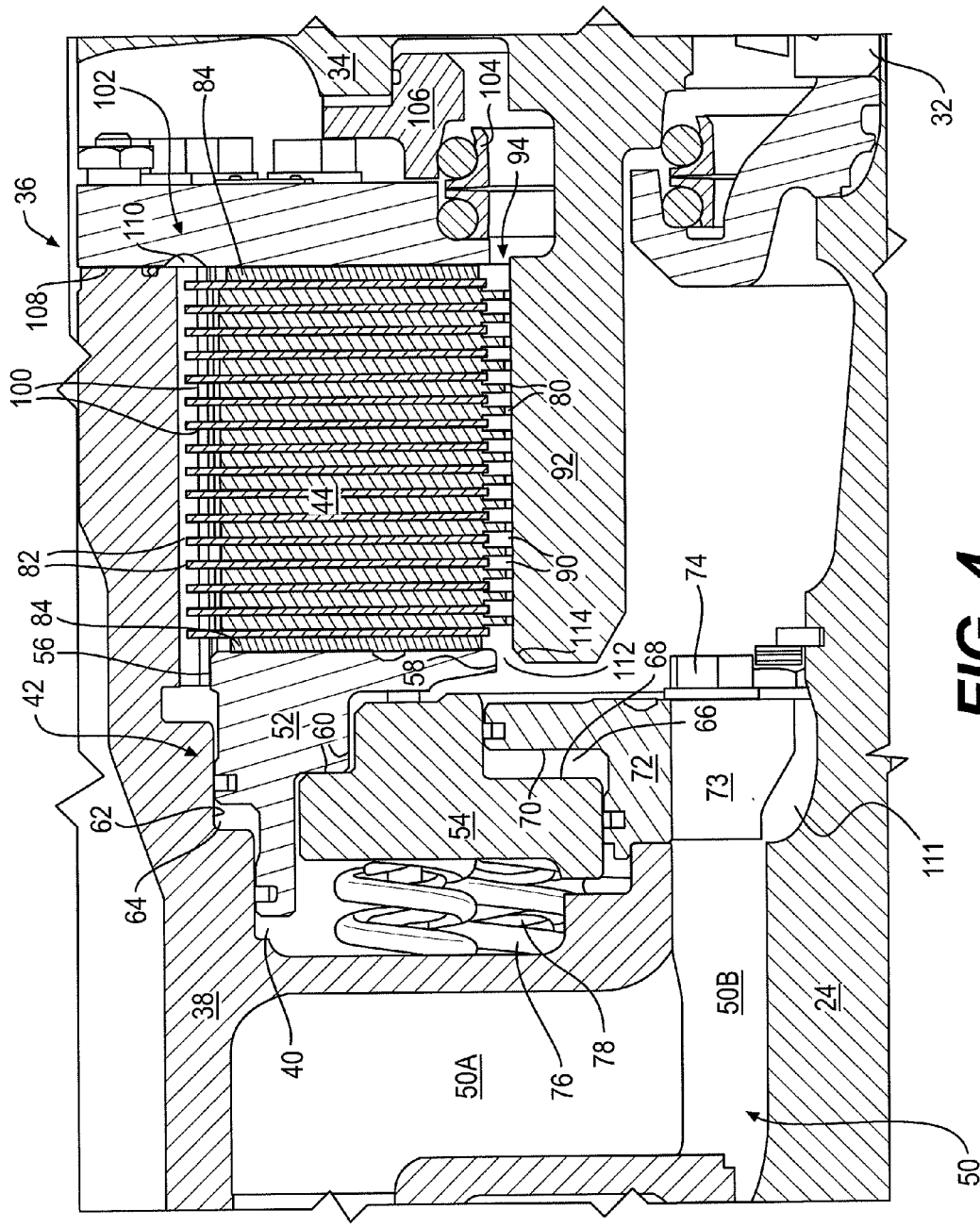
FIG. 4 is another cross-sectional illustration of the brake assembly of FIG. 3.

Right and left final drives 12, 14 may each be equipped with an internal brake assembly 36 configured to resist rotation of output member 20 relative to internal housing 24. Referring to FIGS. 3 and 4, brake assembly 36 may include, among other things, a stationary main brake housing 38 that, together with webs 34 of output member 20, at least partially forms an enclosed annular recess or cavity 40. Recess 40 may be configured to receive an actuator 42, a disc stack 44, and a reaction plate 46 located at an end of disc stack 44 opposite actuator 42 to close off an end of recess 40.

Main brake housing 38 may be a ring-like and generally hollow structure that is fixedly connected to internal housing 24 by way of one or more fasteners (e.g., by way of a snap ring and one or more shims that axially position main brake housing 38 relative to internal housing 24). In an exemplary embodiment, main brake housing 38 may be formed through a casting process, and include a coolant inlet 48 (shown only in FIG. 3) and a coolant outlet 50 (shown only in FIG. 4) that are angularly offset from each other and in fluid communication with recess 40. Coolant inlet 48 and coolant outlet 50 may be also be formed during the casting process and, in some embodiments, coolant inlet 48 and coolant outlet 50 may have as-cast surfaces. In other embodiments, however, coolant inlet 48 and/or coolant outlet 50 may have one or more surfaces that are subsequently machined to control dimensions of coolant inlet and/or outlet 48, 50 within specified tolerances that improve coolant flow and/or reduce restriction on coolant flow. For example, coolant outlet 50 may include an as-cast radial portion 50A and a machined axial portion 50B.

For the purposes of this disclosure, a machined surface may be considered a surface achieved through a material removal process to create desired geometry. Conventional machining processes include, without limitation, turning, boring, drilling, milling, broaching, sawing, shaping, planing, reaming, tapping, grinding, discharge machining, electrochemical machining, electron beam machining, photochemical machining, and ultrasonic machining. In contrast to a machined surface, a cast surface may be a surface created through a material addition process. For example, a cast surface may be created when a molten material is deposited within a mold and cooled to a solid state in a particular geometric design.

Actuator 42 may include a service piston 52 and a park piston 54 that work separately and together at different times to slow, stop, or hold machine 10 still under different conditions. Service piston 52 may be ring-like and have a generally L-shaped cross section defining an outer annular surface 56 (at the back of the L-shape), an inner annular surface 58 (at the tip end of the L-shape), and at least one internal shoulder 60 located between outer and inner annular surfaces 56, 58. Outer annular surface 56, together with an inner annular surface 62 of main brake housing 38, may form a first control chamber 64. When first control chamber 64 is filled with pressurized oil, service piston 52 may be urged toward reaction plate 46, thereby compressing disc stack 44. At all times during operation of machine 10, the pressurized fluid may also be directed into a second control chamber 66 formed between an end surface 68 of park piston 54 and an end surface 70 of a park brake housing 72. When second control chamber 66 is filled with pressurized oil, park piston 54 may be urged away from service piston 52, thereby releasing disc stack 44 from axial forces.

In some embodiments, outer annular surface 56 may not form a continuous outer surface. That is, it may be possible to use outer annular surface 56 to pilot service piston 52 within main brake housing 38. In these embodiments, outer annular surface 56 may be formed by annular segments, for example three or more different segments, if desired.

Park brake housing 72 may be generally ring-like and include a machined passage 73 (shown only in FIG. 4) that is in general alignment with coolant outlet 50. Park brake housing 72 may be fixedly connected to main brake housing 38 by way of one or more fasteners 74.

A plurality of first and second springs 76, 78 may be arranged in various configurations and disposed between main brake housing 38 and park piston 54 to bias park piston 54 into engagement with service piston 52. In the disclosed embodiment, first spring 76 may be configured to exert a force on park piston 54 that is about 4-5 times greater than a force exerted on park piston 54 by second spring 78. When pressurized fluid is not supplied into second control chamber 66, for example when machine 10 is turned off, park piston 54 may be biased into engagement with service piston 52 to compress disc stack 44, thereby providing braking of traction devices 22 when machine 10 is parked. The design and use of first and second springs 76, 78 together may provide a required total biasing force, while also providing desired response characteristics of park piston 54 that may not be possible with a single spring.

Disc stack 44 may include a plurality of friction plates 80, a plurality of separator plates 82 interleaved with friction plates 80, and a damper 84 located at one or both ends of disc stack 44. Friction plates 80 may be connected to rotate with output member 20 (via web 34), while separator plates 82 may be connected to stationary main brake housing 38. In this manner, when actuator 42 is activated, friction plates 80 may be sandwiched between actuator 42, separator plates 82, and reaction plate 46, thereby creating frictional torque that resists rotation of output member 20. A pressure of fluid within actuator 42 (i.e., within first control chamber 64) may relate to a magnitude of the frictional torque resisting rotation of output member 20.

Figures 5, 6:
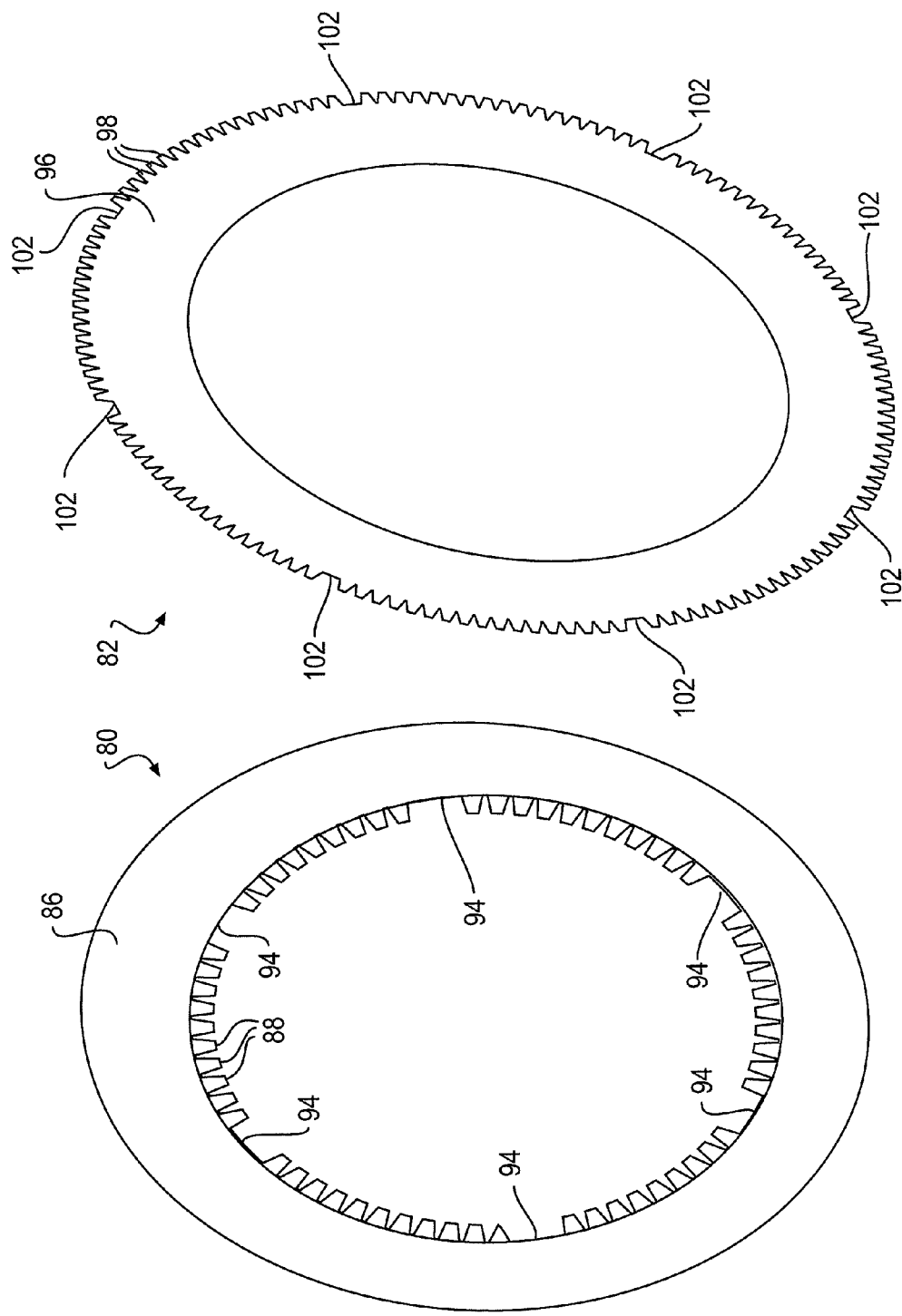
FIG. 5 is an isometric-view illustration of a friction disc that may be used in conjunction with the brake assembly of FIGS. 3 and 4.
FIG. 6 is an isometric-view illustration of a separator plate that may be used in conjunction with the brake assembly of FIGS. 3 and 4.

As shown in FIG. 5, each friction plate 80 may include a generally plate-like ring 86 having a plurality of inwardly extending protrusions (e.g., gear teeth 88) that are configured to engage corresponding outwardly extending geometry (e.g., gear teeth 90 of a spline 92—referring to FIGS. 2-4) associated with web 34 and output member 20 such that friction plates 80 rotate together with output member 20. Each friction plate 80 may be fabricated as a single integral component from metal, for example from steel, and be provided with a bonded friction material, a coating, and/or a roughened texture (e.g., intersecting grooves) at axial surfaces thereof to increase a coefficient of friction of friction plates 80. Brake assembly 36 illustrated in FIGS. 2-4 includes 15 substantially identical friction plates 80 spaced from each other by separator plates 82, although the number of friction plates 80 should correspond with frictional requirements of machine 10.

Gear teeth 88 of friction plates 80 may generally be equally spaced around an inner periphery of ring 86 and configured to engage corresponding gear teeth 90 of spline 92 such that circumferential spaces between adjacent gear teeth 88 are substantially filled with gear teeth 90 of spline 92. In the disclosed embodiment, however, some or all of at least one gear tooth 88 may be missing from some or all friction plates 80 such that at least one axial passage 94 may be formed by the friction plates 80 together at a location of the missing tooth. In some embodiments (e.g., in the embodiment of FIG. 5), more than one gear tooth 88 may be missing to form a plurality of axial passages 94 equally spaced around the inner periphery of disc stack 44. In addition, multiple adjacent gear teeth 88 may be missing such that axial passages 94 may be arranged into groupings of adjacent axial passages 94, the groupings being equally spaced around the periphery of disc stack 44. For the purposes of this disclosure, the term "missing" may refer to both the situations where friction plates 80 are first fabricated with all gear teeth 88 (i.e., initially without axial passages 94) and then select gear teeth 88 are removed to form axial passages 94, or where friction plates 80 are initially fabricated without some gear teeth 88 such that axial passages 94 are integrally formed.

Axial passages 94 may be located at any angular position around the outer periphery of friction plates 80 to promote axial coolant flow and radial coolant distribution through disc stack 44. For example, one or more of axial passages 94 may located in general alignment with coolant inlet 48 to directly receive incoming coolant. Other arrangements of axial passages 94 may also be possible.

As shown in FIG. 6, separator plates 82, like friction plates 80, may also include a generally plate-like ring 96 having a plurality of outwardly extending protrusions (e.g., gear teeth 98) that are configured to engage corresponding inwardly extending geometry (e.g., gear teeth 100 of main brake housing 38—referring to FIGS. 2-4) such that separator plates 82 are held stationary by brake housing 38. Each separator plate 82 may be fabricated as a single integral component, for example from wrought steel. Brake assembly 36 illustrated in FIGS. 2-4 includes 16 substantially identical separator plates 82, although any number of separator plates 82 may be utilized.

Gear teeth 98 of separator plates 82 may generally be equally spaced around an inner periphery of ring 96 and configured to engage corresponding gear teeth 100 of main brake housing 38 such that circumferential spaces between adjacent gear teeth 98 are substantially filled with gear teeth 100. In the disclosed embodiment, however, some or all of at least one gear tooth 98 may be missing from some or all separator plates 82 such that at least one axial passage 102 may be formed by the separator plates 82 together at a location of the missing tooth 98. In some embodiments (e.g., in the embodiment of FIG. 6), more than one gear tooth 98 may be missing to form a plurality of axial passages 102 equally spaced around the outer periphery of disc stack 44. In addition, multiple adjacent gear teeth 98 may be missing such that axial passages 102 may be arranged into groupings of adjacent axial passages 102, the groupings being equally spaced around the periphery of disc stack 44. For the purposes of this disclosure, the term "missing" may refer to both the situations where separator plates 82 are first fabricated with all gear teeth 98 (i.e., initially without axial passages 102) and then select gear teeth 98 are removed to form axial passages 102, or where separator plates 82 are initially fabricated without some gear teeth 98 such that axial passages 102 are integrally formed.

Like axial passages 94, axial passages 102 may be located at any angular position around the inner periphery of separator plates 82 to promote axial coolant flow and radial coolant distribution through disc stack 44. For example, one or more of axial passages 102 may located in general alignment with coolant outlet 50 to directly discharge exiting coolant. Other arrangements of axial passages 102 may also be possible.

Reaction plate 46 may be a stationary member that is operatively coupled to internal housing 24 via main brake housing 38. In some embodiments, reaction plate 46 may be considered to form a portion of main brake housing 38, and close off recess 40 that contains the remaining components of brake assembly 36. In this configuration, reaction plate 42 may function as an end-stop for service and park pistons 52, 54 such that, when service and/or park pistons 52, 54 are pushed against disc stack 44 by pressurized fluid, reaction plate 42 may create an opposing force that effectively sandwiches friction and separator plates 480, 82 therebetween. A seal 104 (e.g., a dual o-ring face seal) and seal retainer 106 may be disposed between reaction plate 46 and an axial end of web 34 to seal a sliding interface between the rotating and stationary components of brake assembly 36. Seal retainer 106 may be fixedly joined to web 34 by, for example, one or more fasteners 103 (shown only in FIG. 5)

As shown in FIGS. 3 and 4, reaction plate 46 may include at an internal surface 108, an annular groove 110. Annular groove 110 may be generally positioned at an end of axial passages 102 and be configured to help distribute coolant from axial passages 102 annularly around disc stack 44. In particular, as coolant flows into brake assembly 36 via coolant inlet 48, the coolant may continue axially along the exterior of disc stack 44 via axial passages 102 (from left to right in FIGS. 2-4), until the coolant reaches reaction plate 46. While in axial passages 102, the coolant may flow in two different directions. First, the coolant may flow radially inward through disc stack 44 to axial passages 94 located at the interior of disc stack 44. Second, the coolant around the distal end of disc stack 44 through annular groove 110 before finding a less-restricted pathway radially inward. In this manner, annular groove 110 may help to distribute the incoming coolant around disc stack 44. After moving radially inward through disc stack 44 to axial passages 94, the coolant may be passed back out of brake assembly 36 via axial passages 94 (from right to left in FIGS. 2-4) and coolant outlet 50.

To help reduce restrictions to exiting coolant flows, a radially-located annular gap 112 may be maintained between inner annular surface 58 of service piston 52 and an outer annular surface 114 at a distal tip end of spline 92. In particular, spline 92 may be designed such that a distal end surface of spline 92 is chamfered and terminates at an axial point about midway along inner annular surface 58 of service piston 52, thereby forming annular gap 112. In the disclosed embodiment, annular gap 112 may have a radial dimension of at least 1 mm (e.g., about 1-5 mm).

For similar reasons, a dimension of the outer annular surface 56 of service piston 52 (referring to FIGS. 2-4) may be tightly controlled. That is, outer annular surface 56 may be designed to have an outer diameter about equal to an outer diameter of friction plates 80, such that service piston 52 does not extend into and thereby restrict a flow path of coolant inlet 48 and/or axial passages 102.

Similar to annular groove 110, another annular groove 111 (as shown in FIGS. 3 and 4) may be disposed within main brake housing 38 at an opposing end of axial passages 94 and be configured to help collect coolant from axial passages 94 for enhanced discharge into coolant outlet 50 (referring to FIG. 4). In particular, as coolant flows through disc stack 44, the coolant may eventually radially exit disc stack 44 via axial passages 94. Instead of requiring this coolant to flow around disc stack 44 via restricted clearances to the one axial passage 94 in general alignment with coolant outlet 50, the coolant can instead flow down each of axial passages 94 (from right to left in FIGS. 2-4), until the coolant reaches annular passage 111. While in annular passage 111, the coolant may flow around the end of disc stack 44 without significant restriction, until the coolant reaches outlet 50. The coolant may then be discharged from brake assembly 34 via annular passage 111.

Damper 84 may be generally ring-like and fabricated from a dampening material such as a polymer (e.g., rubber) or cork that is bonded or otherwise fastened to a more rigid backing (not shown). In some embodiments, damper 84 may be bonded to an end-located separator plate 82. Damper 84 may be configured to dampen vibrations within brake assembly 36.

INDUSTRIAL APPLICABILITY

The disclosed brake assembly may be applicable to any final drive where longevity of the drive is desired. The disclosed brake assembly may provide for longevity of the final drive through novel geometry and/or dimensions that help reduce coolant pressures in the vicinity of seals, thereby reducing a likelihood of the seals leaking or failing completely.

It has been determined that the life of a final drive can be shortened when seals within the associated brake assembly are exposed to elevated pressures. In particular, in a wet brake assembly, components of the brake assembly are exposed to coolant that is circulated through the assembly to cool the components. In order to achieve desired cooling of brake assembly components, coolant of a particular temperature must be circulated at a particular rate through the brake assembly. This particular flow rate, combined with a viscosity of the coolant and restrictions placed on the coolant within the brake assembly, result in pressurization of the coolant. If the pressure of the coolant in the vicinity of seals becomes too high, the seals can be caused to leak coolant. This leaking coolant, if left unchecked, can lead to system failures and/or environmental violations.

In the disclosed brake assembly, care has been taken to help ensure that coolant pressures in the vicinity of seals, for example in the vicinity of seal 104, are maintained within acceptable ranges that extend the life of final drives 12, 14. Specifically, coolant may be directed into brake assembly 36 at a location of highest restriction, such that system pressures are reduced by the restriction prior to coming into contact with seal 104, and restrictions downstream of seal 104 have been reduced to thereby help maintain low pressures at seal 104. For example, coolant may be directed into brake assembly 36 via coolant inlet 48, and axially along a length of disc stack 44 via axial passages 102. During this time, the coolant may find the least restrictive pathways radially inward through disc stack 44, where heat can be absorbed from friction and/or separator plates 80, 82, until the coolant reaches axial passages 94. In addition, coolant that has reached an end of axial passages 102 may be distributed around the outer periphery of disc stack 44 until other pathways of lesser restriction through to axial passages 94 can be found. While the coolant is flowing from the outer-located axial passages 102 inward through disc stack 44 to the inner-located axial passages 94, the flow of coolant is being restricted to some degree. Upon reaching axial passages 94, however, the restriction is reduced and, accordingly, a pressure of the coolant may not increase as much. From axial passages 94, the coolant may be allowed to flow into the vicinity of seal 104 (i.e., rightward in FIGS. 2-4) and swirl around in this general area. At the same time, the coolant may be allowed to flow back toward service piston 52 (i.e., leftward in FIGS. 2-4) and pass through annular gap 112. The size of annular gap 112 may be designed such that a significant restriction is not placed on the exiting flow of coolant, thereby helping to maintain low pressures on the exit side of disc stack 44. From annular gap 112, the coolant may flow through passage 73 in park brake housing 72 and continue axially through coolant outlet 50 in main brake housing 38. The machined surfaces of park and main brake housings 72, 38 may help to ensure adequate cross-sectional area and/or surface textures that help to reduce restriction of the exiting flows of coolant.

It will be apparent to those skilled in the art that various modifications and variations can be made to the brake assembly of the present disclosure without departing from the scope of the disclosure. Other embodiments will be apparent to those skilled in the art from consideration of the specification and practice of the brake assembly disclosed herein. For example, although axial passages 94 and 102 are described as being formed by omitting teeth from friction and separator plates 80, 82, it is contemplated that axial passages 94 and/or 102 may alternatively or additionally be formed by omitting teeth from main brake housing 38, spline 92, or other similar components of brake assembly 36, if desired. It is intended that the specification and examples be considered as exemplary only, with a true scope of the disclosure being indicated by the following claims and their equivalents.

What is claimed is:

1. A brake assembly, comprising:
    a stationary housing forming a coolant inlet and a coolant outlet;
    a rotatable member;
    a disc stack disposed within a cavity at least partially formed by the stationary housing and the rotatable member, the disc stack having a plurality of friction plates operatively coupled to the rotatable member and a plurality of separator plates interleaved with the plurality of friction plates and operatively coupled to the stationary housing;
    a piston disposed within the cavity and configured to compress the disc stack;
    a seal located at an axial interface between the stationary housing and the rotatable member and downstream of the disc stack relative a flow of coolant from the coolant inlet to the coolant outlet;
    a first axial passage formed in the disc stack and directly fluidly connected to the coolant inlet such that coolant flows axially from the coolant inlet into the first axial passage; and
    a second axial passage formed in the disc stack between a spline and the disk stack and fluidly connected to the coolant outlet,
    wherein the second axial passage includes a first end located at a first end of the spline and fluidly connected to an area around the seal and a second end located at a second end of the spline and fluidly connected to the coolant outlet by an annular gap, and
    wherein the area around the seal is enclosed except for a fluid connection with the first end of the second axial passage.

2. The brake assembly of claim 1, wherein the coolant outlet is located radially inward of the coolant inlet.

3. The brake assembly of claim 1, wherein:
    each of the plurality of friction plates is generally ring-like and includes a first plurality of teeth extending radially inward to engage a second plurality of teeth extending radially outward from the rotatable member such that spaces between adjacent teeth of the first plurality of teeth are substantially filled with teeth from the second plurality of teeth;

each of the plurality of separator plates is generally ring-like and includes a third plurality of teeth extending radially-outward to engage a fourth plurality of teeth extending radially inward from the stationary housing such that spaces between adjacent teeth of the third plurality of teeth are substantially filled with teeth from the fourth plurality of teeth;

at least one tooth of the third plurality of teeth is missing such that the first axial passage is formed at a location of the missing at least one tooth of the third plurality of teeth; and at least one tooth of the first plurality of teeth is missing such that the second axial passage is formed at a location of the missing at least one tooth of the first plurality of teeth.

4. The brake assembly of claim 3, wherein the first axial passage is in direct fluid communication with the coolant inlet and a cross-sectional area of the first axial passage is smaller than a cross-sectional area of the coolant inlet.

5. The brake assembly of claim 3, wherein the second axial passage is in direct fluid communication with the coolant outlet and the second axial passage is located radially outward from an entrance into the coolant outlet formed by a passage formed in a park brake housing.

6. The brake assembly of claim 3, wherein:
the first axial passage includes more than one axial passage; and
the second axial passage includes more than one axial passage.

7. The brake assembly of claim 3, wherein the first axial passage includes a plurality of equally spaced axial passages.

8. The brake assembly of claim 3, wherein the first axial passage includes a plurality of axial passages arranged in equally spaced groupings of passages.

9. The brake assembly of claim 1, further including an end plate connected to the housing and disposed at an end of the disc stack opposite the piston, at least one of the housing and the end plate having an annular groove in fluid communication with the first axial passage and configured to distribute coolant annularly around the disc stack.

10. The brake assembly of claim 3, wherein:
the second plurality of teeth form a spline extending axially from the rotatable member toward the stationary housing;
the piston is generally ring-like and includes an inner annular surface; and
an annular gap exists between an outer annular surface of the spline and the inner annular surface of the piston.

11. The brake assembly of claim 10, wherein the gap has a radial dimension of at least 1 mm.

12. The brake assembly of claim 10, wherein a distal end surface of the spline terminates at about an axial midpoint of the inner annular surface.

13. The brake assembly of claim 10, wherein the piston includes a segmented outer annular surface having an outer diameter about equal to an outer diameter of the plurality of friction plates.

14. The brake assembly of claim 1, wherein at least a first portion of the coolant outlet has a machined annular surface and at least a second portion of the coolant outlet has a cast surface.

15. The brake assembly of claim 14, wherein an axial entry portion of the coolant outlet has a machined annular surface.

16. The brake assembly of claim 15, further including a park brake housing connected to the stationary housing and having a machined axial passage in general alignment with the axial entry portion of the coolant outlet.

17. The brake assembly of claim 1, wherein the seal is a double o-ring face seal.

18. The brake assembly of claim 1, wherein the area around the seal is enclosed such that coolant only flows into the coolant outlet from the second axial passage through the annular gap.

19. A method of cooling a brake assembly, comprising:
directing coolant axially into the brake assembly through a stationary housing to an outer periphery of a disc stack, including directing coolant directly from a coolant inlet into a first axial passage formed between the disc stack and a first spline;
directing coolant through the first axial passage formed in the disc stack;
directing coolant from the first axial passage radially inward through the disc stack, wherein the first axial passage causes a restriction on a flow of coolant into the disc stack;
directing coolant through a second axial passage formed between the disc stack and a second spline;
directing coolant from a first end of the second axial passage into an area of a seal disposed at an interface between the stationary housing and a rotatable member; and
directing coolant from a second end of the second axial passage axially out of the brake assembly through an annular gap,
wherein the annular gap reduces the restriction on the flow of coolant caused by the first axial passage.

20. A final drive, comprising:
a stationary brake housing forming a coolant inlet and a coolant outlet located radially inward from the coolant inlet;
a stationary spindle connected to the stationary brake housing;
a wheel;
a disc stack disposed within a cavity at least partially formed by the stationary brake housing and the wheel, the disc stack having a plurality of friction plates operatively coupled to the wheel and a plurality of separator plates interleaved with the plurality of friction plates and operatively coupled to the stationary brake housing;
a service piston disposed within the cavity and configured to compress the disc stack; and
a double o-ring face seal located at an axial interface between the stationary brake housing and the wheel and downstream of the disc stack relative a flow of coolant from the coolant inlet to the coolant outlet,
wherein:
each of the plurality of friction plates is generally ring-like and includes a first plurality of teeth extending radially inward to engage a second plurality of teeth extending radially outward from the rotatable member such that spaces between adjacent teeth of the first plurality of teeth are substantially filled with teeth from the second plurality of teeth;
each of the plurality of separator plates is generally ring-like and includes a third plurality of teeth extending radially-outward to engage a fourth plurality of teeth extending radially inward from the stationary housing such that spaces between adjacent teeth of the third plurality of teeth are substantially filled with teeth from the fourth plurality of teeth; and
at least a first tooth of the first plurality of teeth and at least a second tooth of the third plurality of teeth are missing such that at least a first axial passage and at least a second axial passage are formed at locations of the missing at least a first tooth and at least a second tooth;

the at least a first axial passage is in direct fluid communication with the coolant inlet and is formed between the disc stack and a first spline; and the at least a second axial passage is in fluid communication with the coolant outlet through an annular gap and is formed between the disc stack and a second spline, wherein the second axial passage includes a first end located at a first end of the second spline and fluidly connected to an area around the seal and a second end located at a second end of the second spline and fluidly connected to the coolant outlet by an annular gap, and wherein the area around the seal is enclosed except for a fluid connection with the first end of the second axial passage such that coolant only flows from the second axial passage into the coolant outlet through the annular gap.

* * * * *